United States Patent
Vinyals et al.

(10) Patent No.: US 11,715,009 B2
(45) Date of Patent: Aug. 1, 2023

(54) TRAINING NEURAL NETWORKS USING SYNTHETIC GRADIENTS

(71) Applicant: DEEPMIND TECHNOLOGIES LIMITED, London (GB)

(72) Inventors: Oriol Vinyals, London (GB); Alexander Benjamin Graves, London (GB); Wojciech Czarnecki, London (GB); Koray Kavukcuoglu, London (GB); Simon Osindero, London (GB); Maxwell Elliot Jaderberg, London (GB)

(73) Assignee: DeepMind Technologies Limited, London (GB)

( * ) Notice: Subject to any disclaimer, the term of this patent is extended or adjusted under 35 U.S.C. 154(b) by 604 days.

(21) Appl. No.: 16/303,595

(22) PCT Filed: May 19, 2017

(86) PCT No.: PCT/US2017/033697
§ 371 (c)(1),
(2) Date: Nov. 20, 2018

(87) PCT Pub. No.: WO2017/201506
PCT Pub. Date: Nov. 23, 2017

(65) Prior Publication Data
US 2020/0320396 A1 Oct. 8, 2020

Related U.S. Application Data (60) Provisional application No. 62/339,764, filed on May 20, 2016.

(51) Int. Cl.
*G06N 3/084* (2023.01)
*G06N 3/044* (2023.01)
*G06N 3/045* (2023.01)

(52) U.S. Cl.
CPC ............ *G06N 3/084* (2013.01); *G06N 3/044* (2023.01); *G06N 3/045* (2023.01)

(58) Field of Classification Search
CPC ......... G06N 3/084; G06N 3/044; G06N 3/045
See application file for complete search history.

(56) References Cited

FOREIGN PATENT DOCUMENTS

WO   WO 2015/011688   1/2015

OTHER PUBLICATIONS

Lu,OnTrainingtheRecurrentNeuralNetworkEncoder-DecoderforLargeVocabularyEnd-to-EndSpeechRecognition,2016IEEEInternationalConferenceonAcoustics,SpeechandSignalProcessing,ICASSP,Mar. 2016 (Year: 2016).*

(Continued)

*Primary Examiner* — Viker A Lamardo
*Assistant Examiner* — Shien Ming Chou
(74) *Attorney, Agent, or Firm* — Fish & Richardson P.C.

(57) ABSTRACT

Methods, systems, and apparatus, including computer programs encoded on a computer storage medium, for training a neural network including a first subnetwork followed by a second subnetwork on training inputs by optimizing an objective function. In one aspect, a method includes processing a training input using the neural network to generate a training model output, including processing a subnetwork input for the training input using the first subnetwork to generate a subnetwork activation for the training input in accordance with current values of parameters of the first subnetwork, and providing the subnetwork activation as input to the second subnetwork; determining a synthetic gradient of the objective function for the first subnetwork by processing the subnetwork activation using a synthetic gradient model in accordance with current values of parameters (Continued)

of the synthetic gradient model; and updating the current values of the parameters of the first subnetwork using the synthetic gradient.

18 Claims, 4 Drawing Sheets

(56) References Cited

OTHER PUBLICATIONS

Sutskever,TrainingRecurrentNeuralNetworks,ThesisofDoctorofPhilosophy,UniversityofToronto,2013 (Year: 2013).*
AWS, Retraining Models on New Data, Amazon Machine Learning Documentation, 2015 (Year: 2015).*
Feldkamp, Phased Backpropagation: A Hybrid of BPTT and Temporal BP, 1998 IEEE International Joint Conference on Neural Networks Proceedings. IEEE World Congress on Computational Intelligence vol. 3, 2262-2267, 1998 (Year: 1998).*
Copjak, Advanced Architectures Distributed System for the Implementation of Neural Networks, 12th IEEE International Conference on Emerging eLearning Technologies and Applications, 2014 (Year: 2014).*
Lee et al., Difference target propagation; LNCS vol. 9284, pp. 498-515, 2015 (Year: 2015).*
Taylor et al. Training Neural Network without Gradients: A Scalable ADMM Approach, arXiv, 2016 (Year: 2016).*
'yann.lecun.com' [online] "The mnist database of handwritten digits," Available on or before 1998 [retrieved on Feb. 15, 2019] Retrieved from Internet: URL<http://yann.lecun.com/exdb/mnist/> 7 pages.
Balduzzi et al. "Kickback cuts backprop's red-tape: biologically plausible credit assignment in neural networks," arXiv 1411.6191v1, Nov. 23, 2014, 7 pages.
Baxter et al. "Direct gradient-based reinforcement learning," IEEE International Symposium on Circuits and Systems, vol. 3, May 2000, 24 pages.
Bengio. "How auto-encoders could provide credit assignment in deep networks via target propagation," arXiv 1407.7906v3, Sep. 18, 2014, 34 pages.
Carreira-Perpinan et al. "Distributed optimization of deeply nested systems," AISTATS, Apr. 2014, 10 pages.
Cooijmans et al. "Recurrent batch normalization," arXiv 1603.09025v5, Feb. 28, 2017, 13 pages.
Czarnecki et al. "Understanding synthetic gradients and decoupled neural interfaces," arXiv 1703.00522, Mar. 1, 2017, 15 pages.
Fairbank et al. "Value-gradient learning," Proceedings of the 2012 International Joint Conference on Neural Networks, Jun. 10, 2012, 8 pages.
Glorot et al. "Deep sparse rectifier neural networks," International Conference on Artificial Intelligence and Statistics, Jun. 2011, 9 pages.
Graves et al. "Neural turing machines," arXiv 1410.5401v2, Dec. 10, 2014, 26 pages.
Graves. "Generating sequences with recurrent neural networks," arXiv 1308.0850v5, Jun. 5, 2014, 43 pages.
Heess et al. "Learning continuous control policies by stochastic value gradients," NIPS, Dec. 2015, 9 pages.
Hochreiter et al. "Long short-term memory," Neural computation, 9(8), Nov. 1997, 32 pages.
Ioffe et al. "Batch normalization: Accelerating deep network training by reducing internal covariate shift," arXiv 1502.03167v3, Mar. 2, 2015, 11 pages.
Kingma et al. "Adam: A method for stochastic optimization," arXiv 1412.6980v9, Jan. 30, 2017, 15 pages.
Krizhevsky et al. "Learning multiple layers of features from tiny images," Technical Report, University of Toronto, Apr. 2009, 60 pages.
LeCun et al. "Gradient based learning applied to document recognition," Proceedings of the IEEE, 86(11) Nov. 1998, 46 pages.
Lee et al. "Difference target propagation," Lecture Notes in Computer Science, vol. 9284, Aug. 29, 2015, 18 pages.
Lillicrap et al. "Random synaptic feedback weights support error back propagation for deep learning," Nature Communications, Nov. 7, 2016, 10 pages.
Marcus et al. "Building a large annotated corpus of English: The penn treebank," Computational Linguistics, 19(2), Oct. 1993, 25 pages.
Nokland. "Direct feedback alignment provides learning in deep neural networks," Advances in Neural Information Processing Systems, Dec. 2016, 9 pages.
Ollivier et al. "Training recurrent networks online without backtracking," arXiv 1507.07680v2, Nov. 20, 2015, 23 pages.
PCT International Search Report and Written Opinion issued in International Application No. PCT/US2017033697, dated Aug. 4, 2017, 17 pages.
PCT Written Opinion issued in International Application No. PCT/US2017033697, dated Apr. 16, 2018, 9 pages.
Rumelhart et al. "Learning representations by back-propagating errors," Nature 323(6088), Oct. 1986, 4 pages.
Schmidhuber. "Networks adjusting networks," Proceedings of Distributed Adaptive Neural Information Processing, Nov. 1990, 14 pages.
Sutton et al. "Learning to predict by the methods of temporal differences," Machine Learning, 2, Aug. 1988, 36 pages.
Tallec et al. "Unbiased online recurrent optimization," arXiv 1702.05043v3, May 23, 2017, 14 pages.
Taylor et al. "Training neural networks without gradients: a scalable ADMM approach," arXiv 1605.02026v1, May 6, 2016, 10 pages.
Taylor et al. "Training neural networks without gradients: A scalable admm approach," ICML Jun. 2016, 10 pages.
Thomas. "Policy gradient coagent networks," Proceedings of the 25th Annual Conference on Neural Information Processing Systems, Dec. 12, 2011, 9 pages.
Weibos. "Chapter 13: Approximating dynamic programming for real-time control and neural modeling," Handbook of Intelligent Control, Chapter 13, Van Nostrand Reinhold, New York, 1992, 39 pages.
Williams et al. "A learning algorithm for continually running fully recurrent neural networks," Neural computation, 1(2), Jun. 1989, 10 pages.
Williams. "Simple statistical gradient-following algorithms for connectionist reinforcement leaning," Machine Learning, 8(3-4), May 1992, 28 pages.
EP Office Action in European Appln. No. 17729252.1, dated Mar. 31, 2021, 10 pages.

* cited by examiner

TRAINING NEURAL NETWORKS USING SYNTHETIC GRADIENTS

This application is a national stage application under 35 U.S.C. 371 of international application no. PCT/US2017/033697, filed May 19, 2017, which claims priority to U.S. provisional patent application No. 62/339,764, filed May 20, 2016, the entire contents of which are hereby incorporated by reference.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations that trains a neural network on multiple training inputs, i.e., to determine trained values of the parameters of the neural network by optimizing an objective function.

In general, one innovative aspect of the subject matter described in this specification can be embodied in methods performed by one or more computers for training a neural network on a plurality of training inputs by optimizing an objective function, wherein the neural network is configured to receive a network input and to process the network input to generate a network output; the neural network includes a first subnetwork followed by a second subnetwork; and the first subnetwork is configured to, during the processing of the network input by the neural network, receive a subnetwork input, process the subnetwork input to generate a subnetwork activation, and provide the subnetwork activation as input to the second subnetwork. The methods include the actions of processing the training input using the neural network to generate a training model output for the training input, including processing a subnetwork input for the training input using the first subnetwork to generate a subnetwork activation for the training input in accordance with current values of parameters of the first subnetwork and providing the subnetwork activation as input to the second subnetwork; determining a synthetic gradient of the objective function for the first subnetwork by processing the subnetwork activation using a synthetic gradient model in accordance with current values of parameters of the synthetic gradient model; and updating the current values of the parameters.

Other embodiments of this aspect can include one or more of the following optional features. In some implementations, the synthetic gradient model is a different neural network from each of the neural network, the first subnetwork, and the second subnetwork. In some implementations, the methods include the actions of, for each training input, determining a target gradient for the first subnetwork and updating the current values of the parameters of the synthetic gradient model based on an error between the target gradient and the synthetic gradient.

In some implementations, determining the target gradient for the first subnetwork includes backpropagating an actual gradient of the objective function through the neural network to determine the target gradient; or backpropagating a synthetic gradient for the second subnetwork through the second subnetwork to determine the target gradient for the first subnetwork. In some implementations, the first subnetwork includes multiple neural network layers, and updating the current values of the parameters of the first subnetwork using the synthetic gradient includes backpropagating the synthetic gradient through the first subnetwork to update the current values of the parameters of the first subnetwork. In some implementations, the neural network is a feedforward neural network, the first subnetwork is a first neural network layer, and the second subnetwork is a second neural network layer.

In some implementations, the methods further include the actions of determining at least one future synthetic gradient of the objective function for the first subnetwork by processing the subnetwork activation using the synthetic gradient model in accordance with current values of parameters of the synthetic gradient model; and updating the current values of the parameters of the synthetic gradient model based on an error between each future synthetic gradient and a corresponding target future gradient. In some implementations, updating the current values of the parameters of the first subnetwork using the synthetic gradient includes updating the current values of the parameters using the synthetic gradient in place of an actual backpropagated gradient. In some implementations, updating the current values of the parameters of the first subnetwork using the synthetic gradient includes updating the current values of the parameters using the synthetic gradient asynchronously from updating current values of the parameters of the second subnetwork.

In some implementations, the first subnetwork is implemented on one computing device and the second subnetwork is implemented on a different computing device; and the training is optionally part of a distributed machine learning training process that distributes the training across multiple computing devices. In some implementations, the subnetwork input for the training input is a synthetic subnetwork input, and the methods include the actions of processing the training input using a synthetic input model that is configured to process the training input to generate the synthetic subnetwork input. In some implementations, the subnetwork input for the training input is an actual subnetwork input.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. Neural networks can be trained more efficiently using measures that approximate a gradient of an objective function, i.e., measures that are calculated locally for subnetworks without using the actual gradient of the loss function. Neural networks can be scaled to include multiple subnetworks, while at the same time reducing the increase in computational time-cost of and processing power associated with training those neural networks because of their scaled size. Training of subnetworks of neural networks can be more easily parallelized because training of some subnetworks will not be depend on back-propagation of gradients from subsequent subnetworks. Training techniques can approximate gradients of a recurrent neural network from a much larger horizon than the time boundary length used in the truncated backpropagation through time techniques. Neural networks that include temporally hierarchical or modular models can be trained using training techniques that allow approximated error signals to flow between temporal boundaries or modules of those models, while still allowing those temporal boundaries or modules to be optimized at different timescales.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
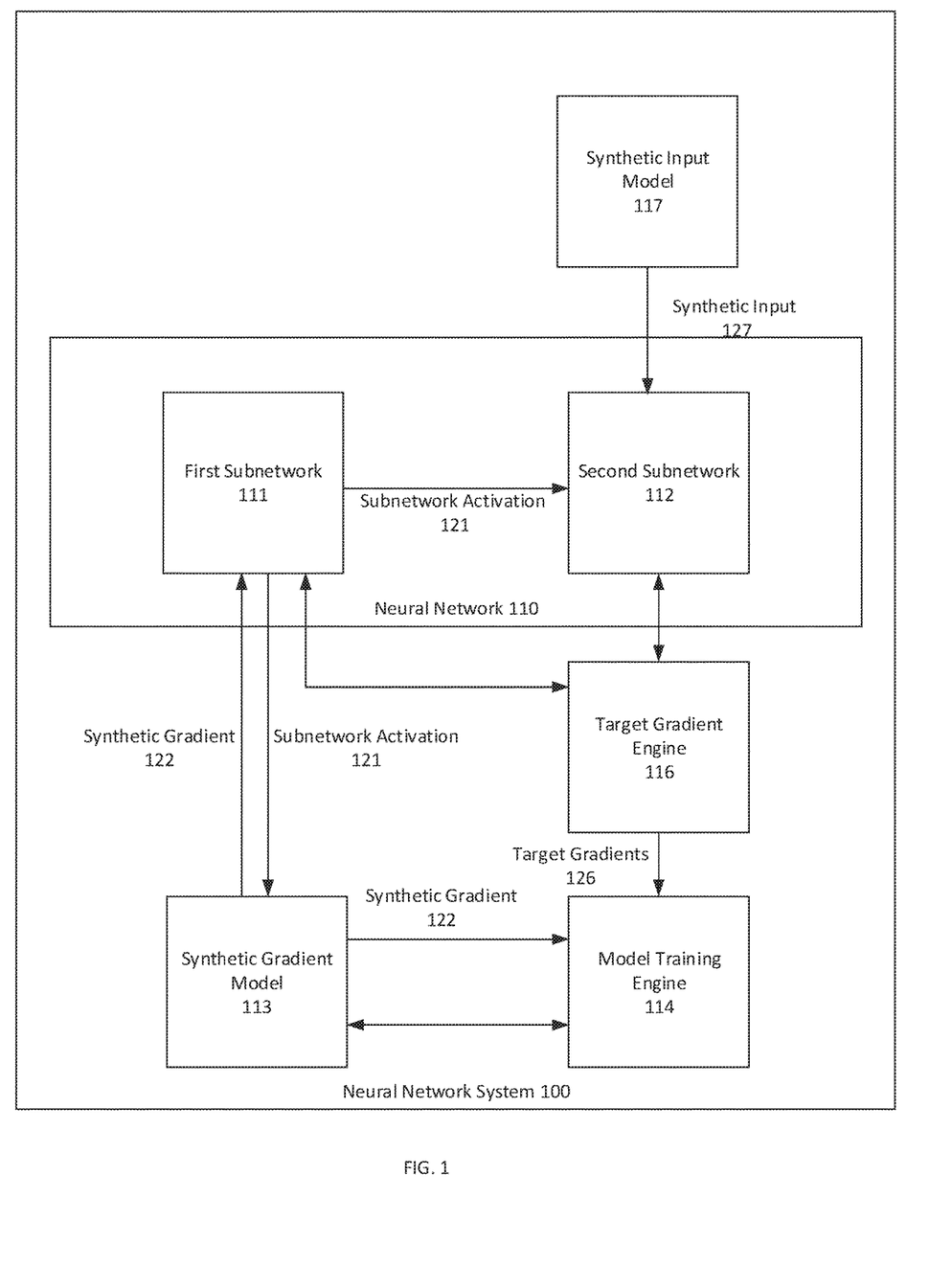
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 includes a neural network 110. The neural network 110 can be configured to perform any kind of machine learning task, i.e., to receive any kind of digital data input and to generate any kind of score, classification, or regression output based on the input.

For example, if the inputs to a neural network are images or features that have been extracted from images, the output generated by the neural network for a given image may be scores for each of a set of object categories, with each score representing an estimated likelihood that the image contains an image of an object belonging to the category.

As another example, if the inputs to a neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to a neural network are features of an impression context for a particular interactive content (such as content containing a hyperlink to other content), the output generated by the neural network may be a score that represents an estimated likelihood that the particular content will be clicked on or interacted with.

As another example, if the inputs to a neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to a neural network is text in one language, the output generated by the neural network may be a score for each of a set of pieces of text in another language, with each score representing an estimated likelihood that the piece of text in the other language is a proper translation of the input text into the other language.

As another example, if the input to a neural network is a spoken utterance, a sequence of spoken utterances, or features derived from one of the two, the output generated by the neural network may be a score for each of a set of pieces of text, each score representing an estimated likelihood that the piece of text is the correct transcript for the utterance or sequence of utterances.

The neural network 110 can be a feed-forward neural network or a recurrent neural network (RNN). A feedforward neural network is a neural network that does not include cycles, while an RNN is a neural network 110 that includes cycles. Generally, an RNN is configured to, at each time step of multiple time steps, process input values for the time step to generate an updated hidden state to provide to a next time step of the multiple time step. Thus, when unrolled, an RNN includes multiple execution stages, where each execution stage corresponds to a different time step in the execution of RNN, i.e. each execution stage corresponds to a different time step during the processing of an input to the RNN.

The neural network 110 includes multiple subnetworks, e.g., a first subnetwork 111 and a second subnetwork 112. Each subnetwork in the neural network 110 can include one or more feed-forward neural network layers or one or more time steps of an RNN. In the context of a feedforward neural network, each subnetwork can include one or more layers of the neural network. In the context of an RNN, each subnetwork can include one or more time steps during the processing of an input to the RNN.

The subnetworks of the neural network 110 are ordered according to a particular order of execution of the subnetworks. For example, a feedforward neural network can have an input layer as its first subnetwork in the particular order, a first hidden layer as its second subnetwork in the particular order, and an output layer as its last subnetwork in the particular order. An RNN can have a first time step as its first subnetwork in the particular order, a second time step as its subnetwork in the particular order, and so on.

Each subnetwork in the neural network 110 other than a last subnetwork in the particular order of the subnetworks can receive a subnetwork input and process the subnetwork input to generate a subnetwork activation and provide the subnetwork activation to a next subnetwork in the particular order of the subnetworks of the neural network 110. For example, the first subnetwork 111 generates a subnetwork activation 112 and provides the subnetwork activation 121 to the second subnetwork 112.

The subnetwork activation generated by a particular subnetwork includes values that the particular subnetwork generates by processing its inputs in accordance with a set of parameter values and applying non-linear transformation functions to the results of that processing. Examples of subnetwork activations include activation values generated by a layer in a feed-forward neural network or hidden state values generated during a time step in execution of an RNN.

In order to improve the capability of the neural network 110 to perform a machine learning task, the neural network system 100 trains the neural network 110 by updating the parameters of the subnetworks of the neural network 110 to optimize an objective function that measures the performance of the neural network 110 on a particular task, e.g., is based on a measure of difference between target outputs in the training data and one or more outputs of the neural network, e.g., a loss function, a reward function, a utility function, etc.

In some training algorithms, the neural network system 100 updates the parameters of the subnetworks of the neural network 110 by computing a gradient of the objective function with respect to the parameters of the neural network 110. Because the objective function depends on the output of the neural network 110 and the output of the neural network 110 in turn depends on the outputs of the subnetworks of the neural network 110, the neural network system 100 can compute the gradient of the objective function with respect to parameters of each particular subnetwork only after the neural network system 100 has computed gradients of the objective function for every subnetwork after the particular subnetwork in the particular order of the subnetworks of the neural network 110. This requires a forward propagation of output values from the particular subnetwork to a last subnetwork in the particular order of the subnetworks in the neural network 110 and a backward propagation of gradients of the objective function from the last subnetwork to the particular subnetwork. This in essence locks the training of a particular subnetwork to the training of all the subnetworks after the particular subnetwork in the particular order of the subnetworks of the neural network 110.

Instead of using a gradient of an objective function to train a particular subnetwork, the neural network system 100 can use a synthetic gradient for the particular subnetwork to train the particular subnetwork. The synthetic gradient for a particular subnetwork is an approximation of the gradient of the objective function for the particular subnetwork that is computed based on the subnetwork activation generated by the particular subnetwork.

The synthetic gradient for a particular subnetwork is generated by a synthetic gradient model for the particular subnetwork. The synthetic gradient model for a particular subnetwork receives as input the subnetwork activation of the particular subnetwork and processes the input in accordance with a set of parameters to generate the synthetic gradient for the particular subnetwork. Once trained, a synthetic gradient model can generate the synthetic gradient without using the loss gradient for the particular subnetwork.

The synthetic gradient model for a particular subnetwork may itself be a neural network. In some implementations, the synthetic gradient model includes a linear layer. In some implementations, the synthetic gradient model is a multi-layer perceptron neural network. In some implementations, the synthetic gradient model is a convolutional neural network.

For example, to train the first subnetwork 111, the first subnetwork 111 sends its subnetwork activation 121 to a synthetic gradient model 113 in addition to sending the subnetwork activation 121 to the second subnetwork 112. The synthetic gradient model 113 processes the subnetwork activation 121 to generate a synthetic gradient 122 for the first subnetwork 113. The neural network system 100 can update the parameters of the first subnetwork 111 using the synthetic gradient 122, e.g., in accordance with a gradient descent algorithm and in place of an actual gradient of the objective function.

Thus, a particular subnetwork can be trained using a synthetic gradient for the particular subnetwork, which is an approximation of the gradient of the objective function for the particular subnetwork that is computed without using the gradient of the objective function and thus without the need for the forward propagation and the backward propagation needed to compute the actual gradient. Therefore, training a particular subnetwork using a synthetic gradient can avoid locking the training of a particular subnetwork in the neural network 110 to training of subsequent subnetworks in the particular order of the subnetworks and thus make training a neural network 110 more efficient, both in terms of speed and/or computational complexity/processing power. This gain in efficiency is especially important for neural networks 110 that have a large number of subnetworks.

In order to improve capability of a synthetic gradient model to estimate the loss gradient for a corresponding subnetwork, the neural network system 100 trains the synthetic gradient using a model training engine 114.

The model training engine 114 trains a synthetic gradient model for a particular subnetwork by updating the parameters of the synthetic gradient model in accordance with conclusions derived from a target gradient 126 for the particular subnetwork. The model training engine 114 can calculate a measure of error between the target gradient 126 for the particular subnetwork and the synthetic gradient generated by the synthetic gradient model for the particular subnetwork and update the parameters of the synthetic gradient model in accordance with the measure of error, e.g., using a training algorithm that uses gradient descent with backpropagation The model training engine 114 receives target gradients 126 from a target gradient engine 116. The target gradient engine 116 can generate a target gradient 126 for any particular subnetwork in the neural network 110.

The model training engine 114 can train a synthetic gradient model during the training of first subnetwork 111 using a particular set of training data. For example, when the synthetic gradient model 113 generates a synthetic gradient, the model training engine 114 can store that value and, after it obtains a target gradient corresponding to the subnetwork activation used to generate stored synthetic gradient from the target gradient engine 116, the model training engine 114 can compute a measure of error between the stored synthetic gradient and the obtained target gradient and update the parameters of the synthetic gradient model 114 in accordance with the computed measure of error. Thus, the model training engine 114 can update the values of the parameters of a synthetic gradient model during training of the neural network 110.

Generating target gradients for subnetworks of a neural network 100 and training the subnetworks using those target gradients is described in greater detail below with reference to FIG. 3.

The subnetwork input to a particular subnetwork may be a training input, an input determined based on an output of a previous subnetwork of the neural network 110 in the particular order of the subnetworks of the neural network 110, or a synthetic input.

A synthetic input for a particular subnetwork is an approximation of an activation value of a subnetwork before the particular subnetwork in the particular order of the subnetworks of the neural network 110. A synthetic input for a particular subnetwork can be generated using a synthetic input model for the subnetwork.

A synthetic model for a particular subnetwork in the neural network 110 is configured to receive a training input for the neural network 110, process the training input in accordance with a set of parameter values, and generate a synthetic input for the particular subnetwork 127. For example, the synthetic input model 117 is configured to process a training input to the neural network 110 in accordance with a set of parameter values to generate the synthetic input 127 for the second subnetwork 112. A synthetic input model for a particular subnetwork can be a separate neural network.

A synthetic input for a particular subnetwork approximates a subnetwork activation of a previous subnetwork in the particular order of the subnetworks of the neural network 110 by using the training input to the neural network 110 and without using the subnetwork activation of the previous subnetwork. As such, supplying a synthetic input to a particular subnetwork instead of a subnetwork activation of a previous subnetwork can avoid locking the execution of the particular subnetwork to the execution of previous subnetworks in the particular orders of the subnetworks of the neural network 110 and thus can improve the speed of inference and/or training of the neural network 110.

The neural network system 100 can train a synthetic input model for a particular subnetwork by updating the parameters of the synthetic input model, e.g., using a training algorithm that uses gradient descent and backpropagation, in accordance with a measure of error between a synthetic input generated by the synthetic input model and a target input for the particular subnetwork. The target input for the particular subnetwork can be the subnetwork activation of a subnetwork of the neural network 110 that gets executed before the particular subnetwork or an output of a previous subnetwork that gets executed before the subnetwork based on processing a synthetic input for the previous input in accordance with a set of parameter values of the previous subnetwork.

The synthetic input model can be a separate neural network. The synthetic input model may have any particular architecture, e.g., a neural network architecture that includes at least one of one or more feedforward fully-connected layers, one or more feedforward convolutional layers, and one or more recurrent layers.

A training engine can train the synthetic input gradient model for a particular subnetwork during the training of the particular subnetwork using a particular set of training data. For example, when the synthetic input model generates a synthetic input, the training engine can store that value and, after it obtains a target input corresponding to the synthetic input from a previous subnetwork in a particular order of the subnetworks of the neural network 110, the training engine can compute a measure of error between the stored synthetic input and the obtained target input and update the parameters of the synthetic input model in accordance with the computed measure of error. Thus, a training engine can update the values of the parameters of a synthetic input gradient model during training of the neural network 110.

Figure 2A:
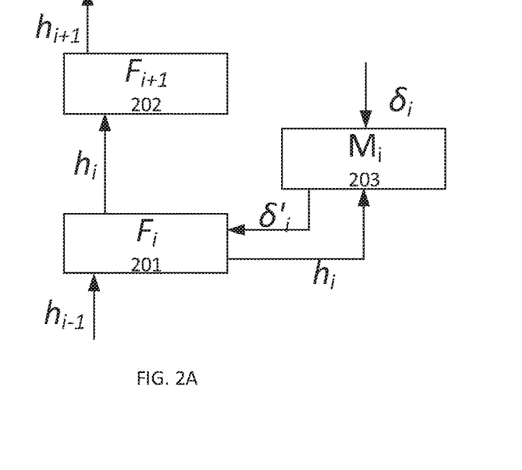
FIG. 2A-2B are data flow diagrams of processes for training subnetworks of neural networks using synthetic gradients.
Figure 2B:
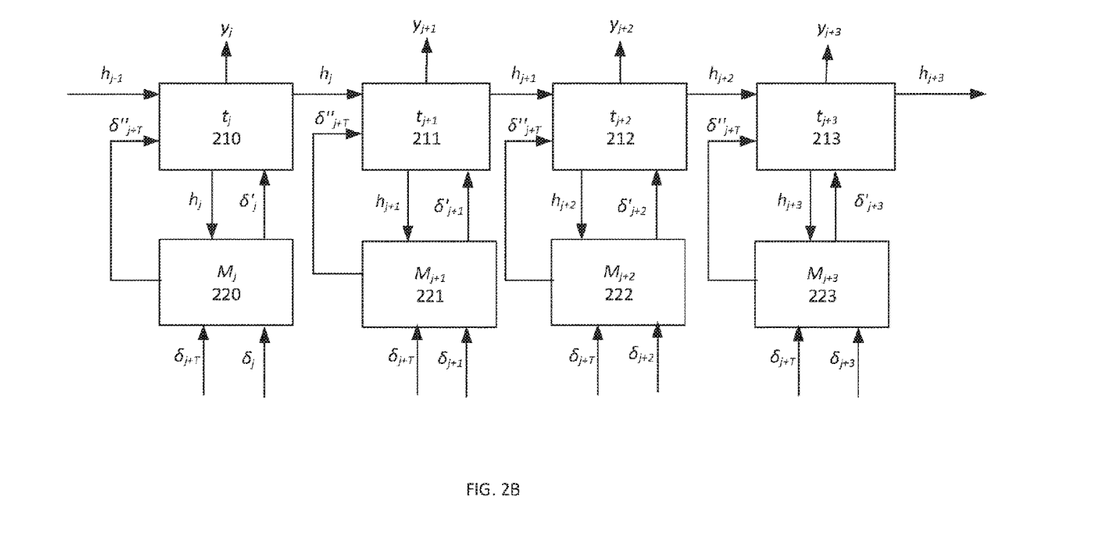

FIGS. 2A-2C are data flow diagrams of processes for training subnetworks of neural networks using synthetic gradients.

FIG. 2A depicts two subnetworks, e.g., layers, of a feed-forward neural network, i.e., subnetwork i 201 and subnetwork i+1 202, each identified by a corresponding function F. A synthetic gradient model $M_i$ 203 receives as input $h_i$, the subnetwork activation generated by the subnetwork i 201, and processes that input to generate $δ'i$, the synthetic gradient for subnetwork i 201. The synthetic gradient is an approximation of $δi$, the loss gradient for subnetwork i 201. The synthetic gradient model 203 can be trained using a measure of error between $δi$ and $δ'i$.

FIG. 2B depicts four subnetworks of an unrolled recurrent neural network, each subnetwork corresponding to a respective time step during the processing of an input by the RNN, i.e., subnetwork j 210, subnetwork j+1 211, subnetwork j+2 212, and subnetwork j+3 213. Each subnetwork produces an output, i.e., $y_n$ where n is the identifier of the subnetwork, and a subnetwork activation such as a hidden state, i.e., $h_n$ where n is the identifier of the subnetwork, that is supplied as an input to a next subnetwork in the neural network, i.e., for use in processing the input at the next time step.

Each subnetwork provides its subnetwork activation to a corresponding synthetic gradient model, i.e., synthetic gradient model 220 for subnetwork j 210, synthetic gradient model 221 for subnetwork j+1 211, synthetic gradient model 222 for subnetwork j+2 212, and synthetic gradient model 223 for subnetwork j+3 213. Each synthetic gradient model processes the subnetwork activation of the corresponding subnetwork to generate a synthetic gradient for the corresponding subnetwork and provides the synthetic gradient to the particular subnetwork. A training engine, e.g., a training engine of the neural network system of FIG. 1, uses the synthetic gradient received from a corresponding synthetic gradient model to update the parameters of the synthetic gradient model.

Each synthetic gradient model for a particular subnetwork can be trained using a measure of error between a synthetic gradient generated by the synthetic gradient model and a target gradient for the particular subnetwork, i.e., $δ_n$ where n is the identifier of the particular subnetwork.

During the training of a synthetic gradient model for a particular subnetwork, each synthetic gradient model can be configured to generate a future synthetic gradient, i.e. future gradient $δ''_{j+T}$. The future synthetic gradient for a particular subnetwork is a prediction, based on the subnetwork activation for the particular subnetwork, of a predicted gradient of an objective function for a predetermined subsequent subnetwork after the particular subnetwork in a particular order of subnetworks in the neural network. For example, the future synthetic gradient for a particular subnetwork may be an prediction of a synthetic gradient for a last subnetwork in a time boundary including the particular subnetwork, such as a time boundary defined by a truncated training algorithm such as a truncated backpropagation through time algorithm that includes the particular subnetwork.

A training engine can use the future synthetic gradient for a particular subnetwork, along with the synthetic gradient for the particular subnetwork, to train the synthetic gradient model for the particular subnetwork. The training engine can compute a measure of error between a future synthetic gradient and a target gradient that is a gradient of the objective function for the particular subsequent subnetwork after the particular network, i.e., target gradient $\delta_{j+T}$, and update the parameters of the synthetic gradient model to minimize the measure of error.

A training engine can train the synthetic gradient model for a particular subnetwork to generate a future synthetic gradient model for the particular subnetwork during training of the particular network. Thus, the training engine can update the values of the parameters of a synthetic gradient model for a subnetwork of a neural network during the training of the neural network.

Figure 3:
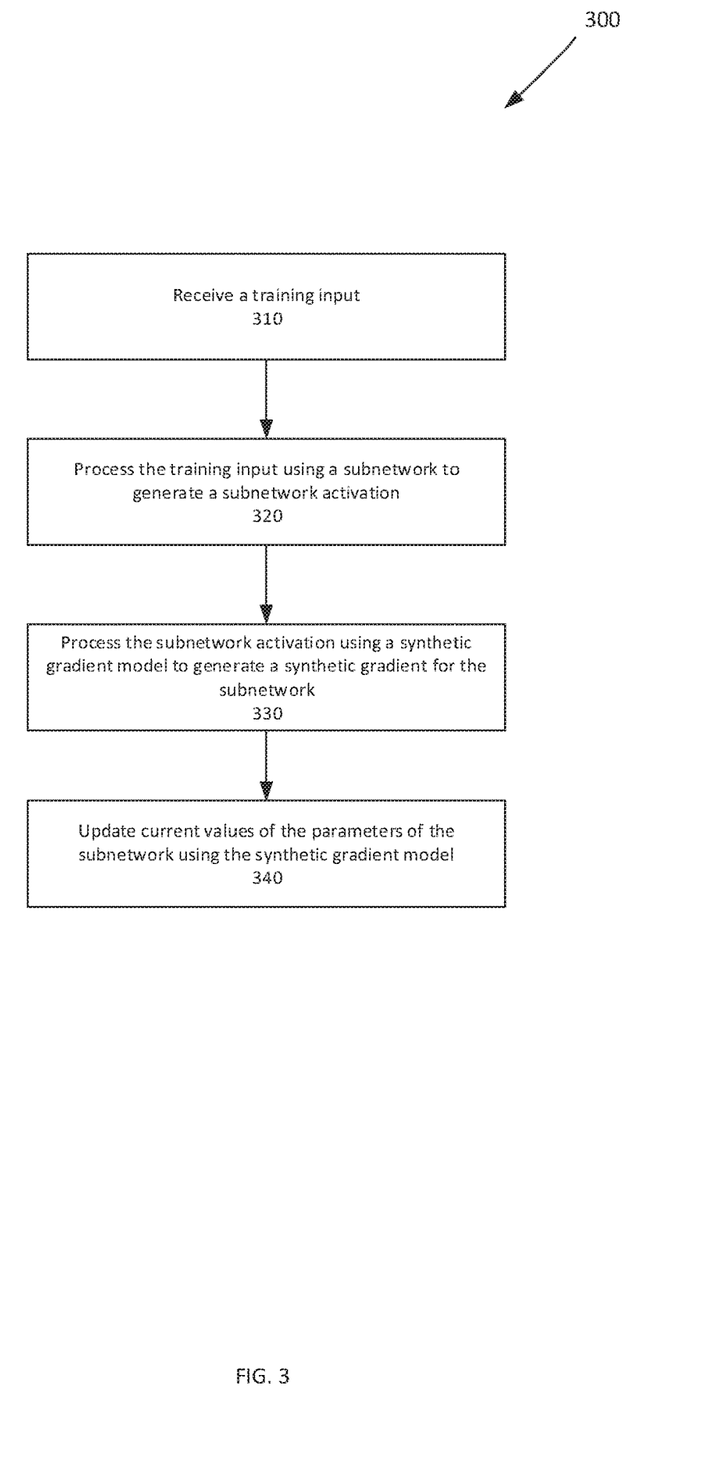
FIG. 3 is a flow-diagram of an example process for training a subnetwork of a neural network using a synthetic gradient for the subnetwork.

FIG. 3 is a flow-diagram of an example process 300 for training a subnetwork of a neural network using a synthetic gradient for the subnetwork. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system receives a training input for the subnetwork (310) and processes the training input using the subnetwork to generate a subnetwork activation (320).

The system processes the subnetwork activation using a synthetic gradient model to generate a synthetic gradient for the subnetwork (330).

The synthetic gradient model processes the synthetic gradient using a set of parameters. The synthetic gradient model uses the set of parameters to transform a subnetwork activation to generate the synthetic gradient value that approximates a loss gradient for the subnetwork.

The set of parameters of the synthetic gradient model can be updated by training the synthetic gradient model. Training the synthetic gradient model is described in greater below with reference to FIG. 4.

For example, the synthetic gradient model for the subnetwork can be a feed-forward neural network including two or more layers that processes the subnetwork activation through the layers in accordance with parameters of the nodes of each layer. A final layer of the synthetic gradient model can generate the synthetic gradient for the subnetwork.

The system updates current values of the parameters of the subnetwork using the synthetic gradient model (340). For example, if the system obtains the synthetic gradient for a subnetwork i, the system can update the current values of a subnetwork n that is before the subnetwork i in the particular order of subnetworks of the neural network by performing the operations of the following gradient-based update rule:

$$\theta_n \leftarrow \theta_n - a\delta'_i \frac{\partial h_i}{\partial \theta_n} n \in \{1, \ldots, i\},$$

where $\theta_n$ is a data structure that includes the parameters of a subnetwork n, a is a learning rate, $\delta'_j$ is the synthetic gradient for the subnetwork i, and $$\frac{\partial h_i}{\partial \theta_n}$$

is a gradient of the output of the subnetwork i with respect to the parameters of the subnetwork n.

Performing the operations of the update rule noted above does not require a complete forward propagation of output values and backward propagation of gradient values in the neural network because all of the terms of that rule can be calculated after execution of the subnetwork and without the need for a complete forward and backward propagation of the neural network. This is in contrast to existing gradient-based update rules that include a loss gradient term that typically is computed with a complete forward and backward propagation of the neural network. By replacing the costly gradient loss term with the more efficient synthetic gradient term, the above update rule can increase the overall efficiency of training subnetworks of neural networks.

If a subnetwork includes multiple layers or time steps, to determine updates to parameter values of layers or time steps other than the top layer or time step in the subnetwork, a training engine may need to backpropagate a synthetic gradient through the layers or time steps in the subnetwork from the top layer or time step.

Figure 4:
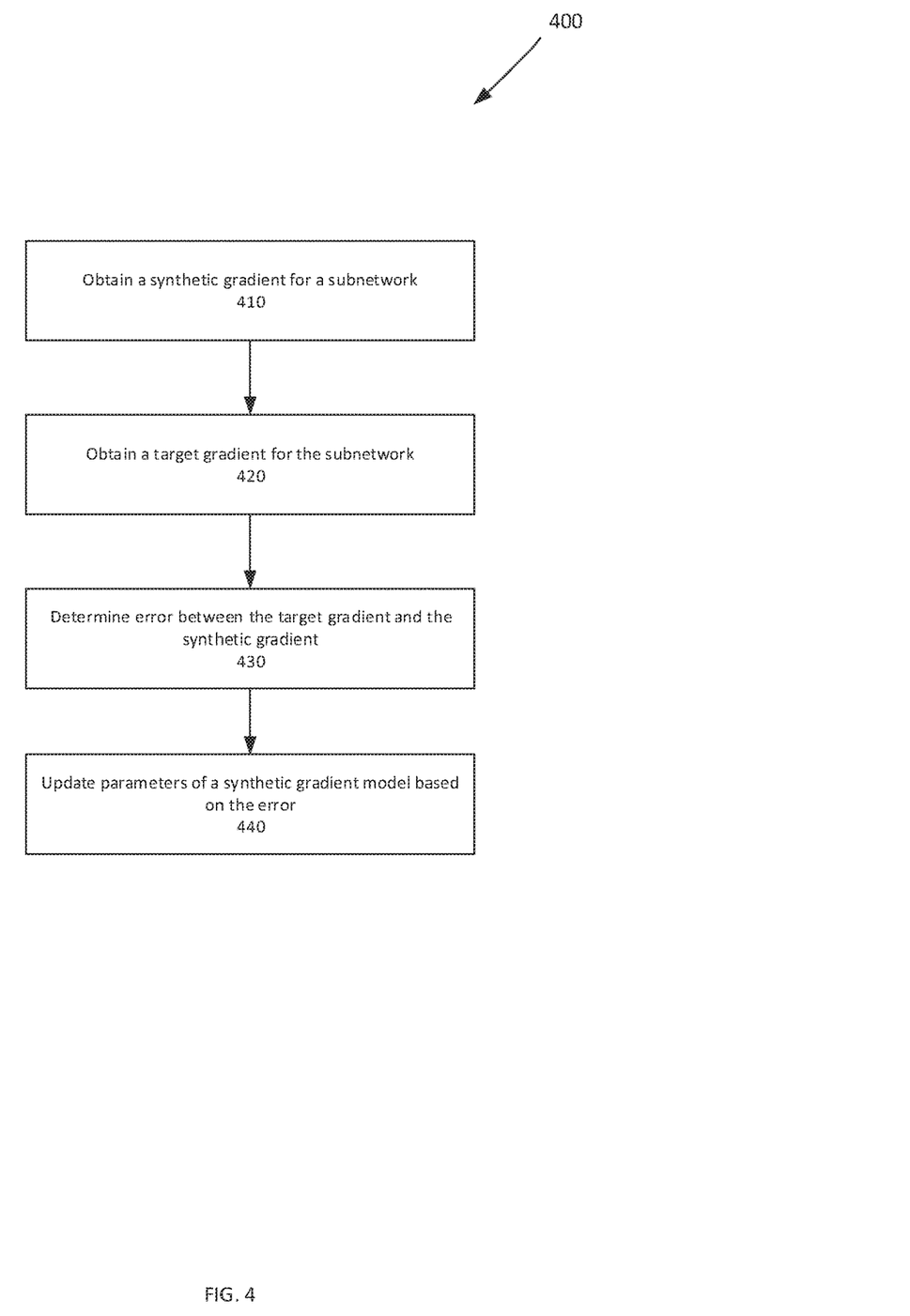
FIG. 4 is a flow diagram of an example process for training a synthetic gradient model for a subnetwork of a neural network.

FIG. 4 is a flow diagram of an example process 400 for training a synthetic gradient model for a subnetwork of a neural network. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system obtains a synthetic gradient (410) and a target gradient (420) for a particular subnetwork.

In some implementations, the system computes the target gradient by backpropagating an actual gradient of a loss function through the neural network. In other words, the target gradient for the subnetwork is the loss gradient that many training algorithms calculate through backpropagation to use to directly train the subnetwork.

In some other implementations, the system computes the target gradient by backpropogating a synthetic gradient for a next subnetwork that is executed after the particular subnetwork through the next subnetwork. In other words, the target gradient is itself a synthetically generated value that is generated based on a synthetic gradient of a subsequent subnetwork.

The system determines a measure of error, such as an L2 distance measure of error, between the target gradient and the synthetic gradient (430) and updates parameters of the synthetic gradient model based on the measure of error (440). In some implementations, the system updates the parameters of the synthetic gradient model based on a training algorithm that uses backpropagation and gradient descent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for training a neural network to perform a task on training data comprising a plurality of training inputs by optimizing an objective function,
    wherein the neural network is configured to receive a network input and to process the network input to generate a network output,
    wherein the objective function is based on a measure of difference between (i) network outputs generated by the neural network by processing the training inputs and (ii) respective target outputs for each of the training inputs that are specified in the training data,
    wherein the neural network comprises a plurality of subnetworks that include a first subnetwork followed by a second subnetwork and followed by a last subnetwork,
    wherein the first subnetwork is configured to, during the processing of the network input by the neural network, receive a corresponding subnetwork input for the network input, process the corresponding subnetwork input for the network input to generate a corresponding subnetwork activation for the network input, and provide the corresponding subnetwork activation for the network input as input to the second subnetwork, and
    wherein the method comprises, for each training input:
        processing the training input using the neural network to generate a training model output for the training input, comprising:
        inputting, into the first subnetwork, a corresponding subnetwork input for the training input;
        processing the corresponding subnetwork input for the training input using the first subnetwork to generate a corresponding subnetwork activation for the training input in accordance with current values of parameters of the first subnetwork, and
        providing the corresponding subnetwork activation for the training input as input to the second subnetwork;
        determining a synthetic gradient for the first subnetwork that is an approximation of a gradient of the objective function with respect to parameters of the first subnetwork, wherein computing the gradient of the objective function with respect to parameters of the first subnetwork requires backward propagation of gradients from the last subnetwork to the second subnetwork and from the second subnetwork into the first subnetwork, and wherein determining the synthetic gradient that is an approximation of the gradient comprises processing the corresponding subnetwork activation using a synthetic gradient model for the first subnetwork in accordance with current values of parameters of the synthetic gradient model, wherein the synthetic gradient model for the first subnetwork is configured to process the corresponding subnetwork activation in accordance with the current values of the parameters of the synthetic gradient model to generate the synthetic gradient for the first subnetwork;
        updating the current values of the parameters of the first subnetwork using the synthetic gradient;
        determining a target gradient of the objective function with respect to the parameters of the first subnetwork by backpropagating a gradient of the objective function with respect to parameters of the second subnetwork from the second subnetwork into the first subnetwork; and
        training the synthetic gradient model to update current values of the parameters of the synthetic gradient model based on an error between (i) the target gradient of the objective function with respect to the parameters of the first subnetwork determined by backpropagating a gradient of the objective function with respect to parameters of the second subnetwork from the second subnetwork into the first subnetwork and (ii) the synthetic gradient for the first subnetwork that is an approximation of the gradient of the objective function with respect to the parameters of the first subnetwork.

2. The method of claim 1, wherein the synthetic gradient model is a different neural network from each of the neural network, the first subnetwork, and the second subnetwork.

3. The method of claim 1, wherein the gradient of the objective function with respect to parameters of the second subnetwork from the second subnetwork into the first subnetwork is:
    an actual gradient of the objective function that has been backpropagated through the neural network; or
    a synthetic gradient for the second subnetwork.

4. The method of claim 1, wherein the first subnetwork comprises multiple neural network layers, and wherein updating the current values of the parameters of the first subnetwork using the synthetic gradient comprises:
    backpropagating the synthetic gradient through the first subnetwork to update the current values of the parameters of the first subnetwork.

5. The method of claim 1, wherein the neural network is a feedforward neural network, the first subnetwork is a first neural network layer, and the second subnetwork is a second neural network layer.

6. The method of claim 1, wherein the neural network is an unrolled recurrent neural network, the first subnetwork is the recurrent neural network at a first time step, and the second subnetwork is the recurrent neural network at a second time step.

7. The method of claim 6, further comprising:
determining at least one future synthetic gradient of the objective function for the first subnetwork by processing the corresponding subnetwork activation for the training input using the synthetic gradient model for the first subnetwork in accordance with current values of parameters of the synthetic gradient model; and
updating the current values of the parameters of the synthetic gradient model based on an error between each future synthetic gradient and a corresponding target future gradient.

8. The method of claim 1, wherein updating the current values of the parameters of the first subnetwork using the synthetic gradient comprises updating the current values of the parameters using the synthetic gradient in place of an actual backpropagated gradient.

9. The method of claim 1, wherein updating the current values of the parameters of the first subnetwork using the synthetic gradient comprises updating the current values of the parameters using the synthetic gradient asynchronously from updating current values of the parameters of the second subnetwork.

10. The method of claim 1, wherein the first subnetwork is implemented on one computing device and the second subnetwork is implemented on a different computing device; and wherein:
the training is part of a distributed machine learning training process that distributes the training across multiple computing devices.

11. The method of claim 1, wherein the corresponding subnetwork input for the training input is a synthetic subnetwork input, and wherein the method further comprises:
processing the training input using a synthetic input model that is configured to process the training input to generate the synthetic subnetwork input.

12. The method of claim 1, wherein the subnetwork input for the training input is an actual subnetwork input.

13. One or more non-transitory computer-readable storage media encoded with instructions that, when executed by one or more computers, cause the one or more computers to perform operations for training a neural network to perform a task on training data comprising a plurality of training inputs by optimizing an objective function,
wherein the neural network is configured to receive a network input and to process the network input to generate a network output,
wherein the objective function is based on a measure of difference between (i) network outputs generated by the neural network by processing the training inputs and (ii) respective target outputs for each of the training inputs that are specified in the training data,
wherein the neural network comprises a plurality of subnetworks that include a first subnetwork followed by a second subnetwork and followed by a last subnetwork,
wherein the first subnetwork is configured to, during the processing of the network input by the neural network, receive a corresponding subnetwork input for the network input, process the corresponding subnetwork input for the network input to generate a corresponding subnetwork activation for the network input, and provide the corresponding subnetwork activation for the network input as input to the second subnetwork, and
wherein the operations comprise, for each training input:
processing the training input using the neural network to generate a training model output for the training input, comprising:
inputting, into the first subnetwork, a corresponding subnetwork input for the training input;
processing the corresponding subnetwork input for the training input using the first subnetwork to generate a corresponding subnetwork activation for the training input in accordance with current values of parameters of the first subnetwork, and
providing the corresponding subnetwork activation for the training input as input to the second subnetwork;
determining a synthetic gradient for the first subnetwork that is an approximation of a gradient of the objective function with respect to parameters of the first subnetwork, wherein computing the gradient of the objective function with respect to parameters of the first subnetwork requires backward propagation of gradients from the last subnetwork to the second subnetwork and from the second subnetwork into the first subnetwork, and wherein determining the synthetic gradient that is an approximation of the gradient comprises processing the corresponding subnetwork activation using a synthetic gradient model for the first subnetwork in accordance with current values of parameters of the synthetic gradient model, wherein the synthetic gradient model for the first subnetwork is configured to process the corresponding subnetwork activation in accordance with the current values of the parameters of the synthetic gradient model to generate the synthetic gradient for the first subnetwork;
updating the current values of the parameters of the first subnetwork using the synthetic gradient;
determining a target gradient of the objective function with respect to the parameters of the first subnetwork by backpropagating a gradient of the objective function with respect to parameters of the second subnetwork from the second subnetwork into the first subnetwork; and
training the synthetic gradient model to update current values of the parameters of the synthetic gradient model based on an error between (i) the target gradient of the objective function with respect to the parameters of the first subnetwork determined by backpropagating a gradient of the objective function with respect to parameters of the second subnetwork from the second subnetwork into the first subnetwork and (ii) the synthetic gradient for the first subnetwork that is an approximation of the gradient of the objective function with respect to the parameters of the first subnetwork.

14. A system comprising one or more computers and one or more storage devices storing instructions that when executed by the one or more computers cause the one or more computers to perform operations for training a neural network to perform a task on training data comprising a plurality of training inputs by optimizing an objective function,
wherein the neural network is configured to receive a network input and to process the network input to generate a network output,
wherein the objective function is based on a measure of difference between (i) network outputs generated by the neural network by processing the training inputs and (ii) respective target outputs for each of the training inputs that are specified in the training data, wherein the neural network comprises a plurality of subnetworks that include a first subnetwork followed by a second subnetwork and followed by a last subnetwork, wherein the first subnetwork is configured to, during the processing of the network input by the neural network, receive a corresponding subnetwork input for the network input, process the corresponding subnetwork input for the network input to generate a corresponding subnetwork activation for the network input, and provide the corresponding subnetwork activation for the network input as input to the second subnetwork, and wherein the operations comprise, for each training input:

processing the training input using the neural network to generate a training model output for the training input, comprising:

inputting, into the first subnetwork, a corresponding subnetwork input for the training input;

processing the corresponding subnetwork input for the training input using the first subnetwork to generate a corresponding subnetwork activation for the training input in accordance with current values of parameters of the first subnetwork, and providing the corresponding subnetwork activation for the training input as input to the second subnetwork;

determining a synthetic gradient for the first subnetwork that is an approximation of a gradient of the objective function with respect to parameters of the first subnetwork, wherein computing the gradient of the objective function with respect to parameters of the first subnetwork requires backward propagation of gradients from the last subnetwork to the second subnetwork and from the second subnetwork into the first subnetwork, and wherein determining the synthetic gradient that is an approximation of the gradient comprises processing the corresponding subnetwork activation using a synthetic gradient model for the first subnetwork in accordance with current values of parameters of the synthetic gradient model, wherein the synthetic gradient model for the first subnetwork is configured to process the corresponding subnetwork activation in accordance with the current values of the parameters of the synthetic gradient model to generate the synthetic gradient for the first subnetwork;

updating the current values of the parameters of the first subnetwork using the synthetic gradient;

determining a target gradient of the objective function with respect to the parameters of the first subnetwork by backpropagating a gradient of the objective function with respect to parameters of the second subnetwork from the second subnetwork into the first subnetwork; and training the synthetic gradient model to update current values of the parameters of the synthetic gradient model based on an error between (i) the target gradient of the objective function with respect to the parameters of the first subnetwork determined by backpropagating a gradient of the objective function with respect to parameters of the second subnetwork from the second subnetwork into the first subnetwork and (ii) the synthetic gradient for the first subnetwork that is an approximation of the gradient of the objective function with respect to the parameters of the first subnetwork.

15. The system of claim 14, wherein the synthetic gradient model is a different neural network from each of the neural network, the first subnetwork, and the second subnetwork.

16. The system of claim 14, wherein the gradient of the objective function with respect to parameters of the second subnetwork from the second subnetwork into the first subnetwork is:

an actual gradient of the objective function that has been backpropagated through the neural network; or a synthetic gradient for the second subnetwork.

17. The system of claim 14, wherein the first subnetwork comprises multiple neural network layers, and wherein updating the current values of the parameters of the first subnetwork using the synthetic gradient comprises:

backpropagating the synthetic gradient through the first subnetwork to update the current values of the parameters of the first subnetwork.

18. The system of claim 14, wherein the neural network is a feedforward neural network, the first subnetwork is a first neural network layer, and the second subnetwork is a second neural network layer.

* * * * *